United States Patent
Bury et al.

(10) Patent No.: US 7,523,061 B2
(45) Date of Patent: Apr. 21, 2009

(54) ONLINE METHOD AND SYSTEM FOR ESTIMATING THE MANUFACTURING COST OF COMPONENTS

(75) Inventors: David Paul Bury, Flat Rock, MI (US); Dale Lawrence Leiting, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1313 days.

(21) Appl. No.: 10/172,931

(22) Filed: Jun. 17, 2002

(65) Prior Publication Data

US 2003/0004768 A1    Jan. 2, 2003

Related U.S. Application Data

(60) Provisional application No. 60/299,295, filed on Jun. 18, 2001.

(51) Int. Cl.
*G06Q 40/00* (2006.01)

(52) U.S. Cl. ............... 705/37; 705/38; 705/36; 705/5

(58) Field of Classification Search ............ 705/30, 705/7, 29, 37, 36, 38, 5; 395/207
See application file for complete search history.

(56) References Cited

U.S. PATENT DOCUMENTS

| | | | |
|---|---|---|---|
| 5,717,595 A | | 2/1998 | Cherrington et al. |
| 5,799,286 A | * | 8/1998 | Morgan et al. ............ 705/30 |
| 5,812,988 A | * | 9/1998 | Sandretto ............ 705/36 R |
| 5,893,082 A | | 4/1999 | McCormick |
| 5,948,040 A | | 9/1999 | DeLorme et al. |
| 6,324,517 B1 | | 11/2001 | Bingham et al. |
| 6,356,880 B1 | | 3/2002 | Goossens et al. |
| 2001/0034686 A1 | * | 10/2001 | Eder ............ 705/36 |
| 2002/0087440 A1 | * | 7/2002 | Blair et al. ............ 705/29 |
| 2003/0083973 A1 | * | 5/2003 | Horsfall ............ 705/37 |

OTHER PUBLICATIONS

Ruddick Corporation Reports Second Quarter Earnings PR Newswire New York: Apr. 24, 2001. p. 1).*

* cited by examiner

*Primary Examiner*—Frantzy Poinvil
*Assistant Examiner*—Clement Graham
(74) *Attorney, Agent, or Firm*—Raymond L. Coppiellie; Brooks Kushman P.C.

(57) ABSTRACT

The present invention relates to an online method and system for estimating the manufacturing cost of a component. A preferred method embodiment of the present invention includes receiving a component model which includes quantitative driver(s) and cost algorithm(s) used to determine the estimated manufacturing cost, receiving values for each quantitative driver, determining the estimated manufacturing costs for the component based on the values for each quantitative driver and the cost algorithm(s), and transmitting the estimated manufacturing cost to a user. A preferred computer system of the present invention is configured to receive a component model which includes quantitative driver(s) and cost algorithm(s), receive values for each quantitative driver, determine the estimated manufacturing costs for the component based on the quantitative driver values and the cost algorithm(s), and transmit the estimated manufacturing cost to a user.

20 Claims, 4 Drawing Sheets

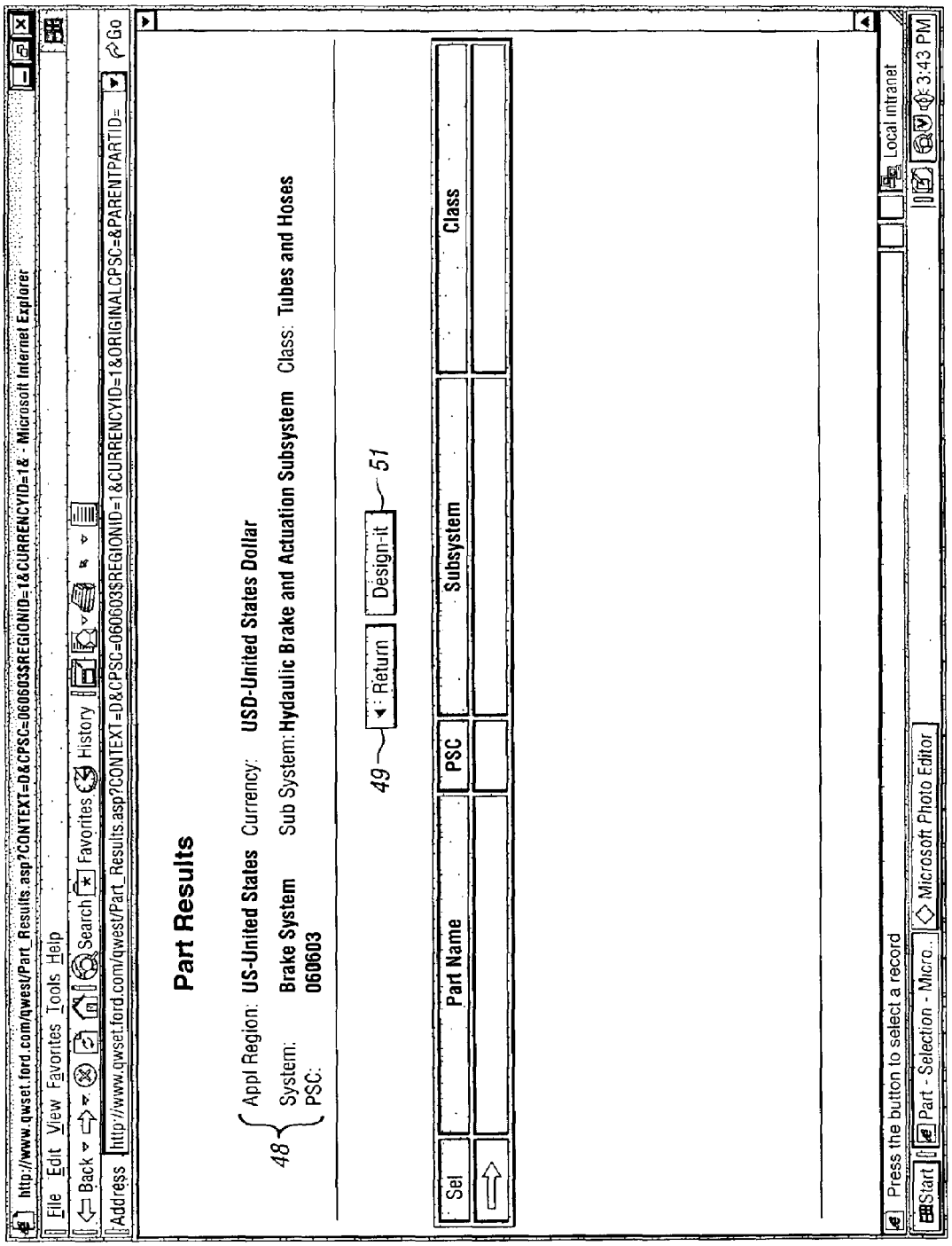

Design-it

Appl Region US-United States  Currency USD-United States Dollar
System Brake System  Sub System: Hydaulic Brake and Actuation Subsystem  Class Tubes and Hoses
PSC: 060603  Part Name: Brake Tubes

| View Report | Scenarios | Save Scenarios | Pre-Designed | Part Selection | Reset |
|---|---|---|---|---|---|

|  | Piece Cost *70* | Tooling Cost *72* | Finished Weight |  |
|---|---|---|---|---|
| *58A-C* Estimate Total: | 5.54 | 52,472 | 0.48 kg | |
| *60A-C* Adjustments Total: | 0.00 | 0 | 0.00 kg | |
| | | | 0.48 kg | Recalculate *66* |
| *62A-D* GrandTotal: | 5.54 | 52,472 | 1.06 kg | Adjustments *64* |

*74*

1 - Brake Tubes

Process Drivers

Make selections starting from top, & pause breifly before each of the following one

| Manufacturing Region | United States ▼ | *53A* |
| Volume: | High Volume (>50K/yr) ▼ | *53B* |
| Material: | Algal ▼ | |
| Tube Diameter: | 4.7625 MM ▼ | *53N* |

OR (Model selection may replace process drivers above)

Model: 199 ▼

Quantitative Drivers *56A* Change quantitative driver values as required. Click the recalculate button

|  |  | Min | Default | Max |
|---|---|---|---|---|
| Annual Part Volume | 300000 pc *56B* | 50000 | 300000 | 2000000 |
| Brake Line Length | 3500 mm | 250 | 1000 | 7000 |
| Tube Length Covered w/Armor | 3000 mm | 0 | 0 | 7000 |
| # of Flex Sections | 1 pc | 0 | 0 | 2 |
| # of Teflon Washers | 25 qty | 0 | 15 | 60 |
| # of Bends | 3 pc | 0 | 0 | 4 |
| # of Metal Brackets | 1 pc | 0 | 0 | 8 |
| # of Bundle Clips | 1 pc | 0 | 0 | 12 |
| # of Simple Clips *56N* | 2 pc | 0 | 0 | 12 |

ONLINE METHOD AND SYSTEM FOR ESTIMATING THE MANUFACTURING COST OF COMPONENTS

CROSS-REFERENCE TO RELATED APPLICATIONS

This application claims the benefit of U.S. provisional application Ser. No. 60/299,295, filed Jun. 18, 2001, and entitled QWEST (quick web estimating software tool).

BACKGROUND OF THE INVENTION

1. Field of the Invention

The present invention relates generally to an online method and system for estimating the manufacturing cost of components and, more particularly, an online method and system of estimating piece cost, tooling cost, and finished weight.

2. Background Art

Cost estimation methods have been developed to provide cost estimates for the manufacture of automotive components, otherwise referred to as parts. An example of a process-based estimation method includes estimating piece cost and tooling cost based on a particular process step (i.e., grinding) defined for a component (i.e., brake pad). This method requires that a user understand all the process steps associated with the component in order to estimate costs associated with manufacturing the component. This detailed process information is typically known by a limited number of experts with extensive knowledge relating to the production of the component. Consequently, this method is only suitable for use by a very limited group of experts. Additionally, experts utilizing the process-based estimation method are required to run estimates on each process step, which can be quite cumbersome.

It would be desirable to provide an online method and system for cost estimation which is component based and can estimate at least piece cost, tooling cost and/or finished weight. This method and system should not require in-depth knowledge of each process step involved in manufacturing a component in order to generate cost estimates.

SUMMARY OF THE INVENTION

The present invention relates to an online method and system for estimating the manufacturing cost of components. One object of the present invention is to provide an online method and system for cost estimation which is component based. Another object of the present invention is to provide an online method and system for cost estimation that can estimate at least piece cost, tooling cost, and/or finished weight. Yet another object of the present invention is to provide an online method and system of cost estimation that does not require in-depth knowledge of each process step involved in manufacturing a component.

A preferred method embodiment of the present invention includes receiving a component model when the component model includes an at least one quantitative driver and an at least one cost algorithm used to determine the estimated manufacturing cost, receiving values for each quantitative driver, determining the estimated manufacturing cost for the component based on the values for each quantitative driver and the at least one cost algorithm, and transmitting the estimated manufacturing cost to a user.

The preferred method embodiment of the present invention may additionally include generating a report that at least contains the estimated manufacturing cost.

A preferred system embodiment of the present invention includes a computer system for estimating the manufacturing cost of a component. The preferred system embodiment is configured to receive a component model wherein the component model includes an at least one quantitative driver and an at least one cost algorithm used to determine the estimated manufacturing cost, receive values for each quantitative driver, determine the estimated manufacturing cost for the component based on the value for each quantitative driver and the at least one cost algorithm, and transmit the estimated manufacturing cost to a user.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a GUI for presenting a retrieved component and related information in accord with a preferred embodiment of the present invention; and FIG. 5 is a GUI for receiving input defining a component cost model in accord with a preferred embodiment of the present invention.

DETAILED DESCRIPTION OF THE PREFERRED EMBODIMENT(S)

Figure 1:
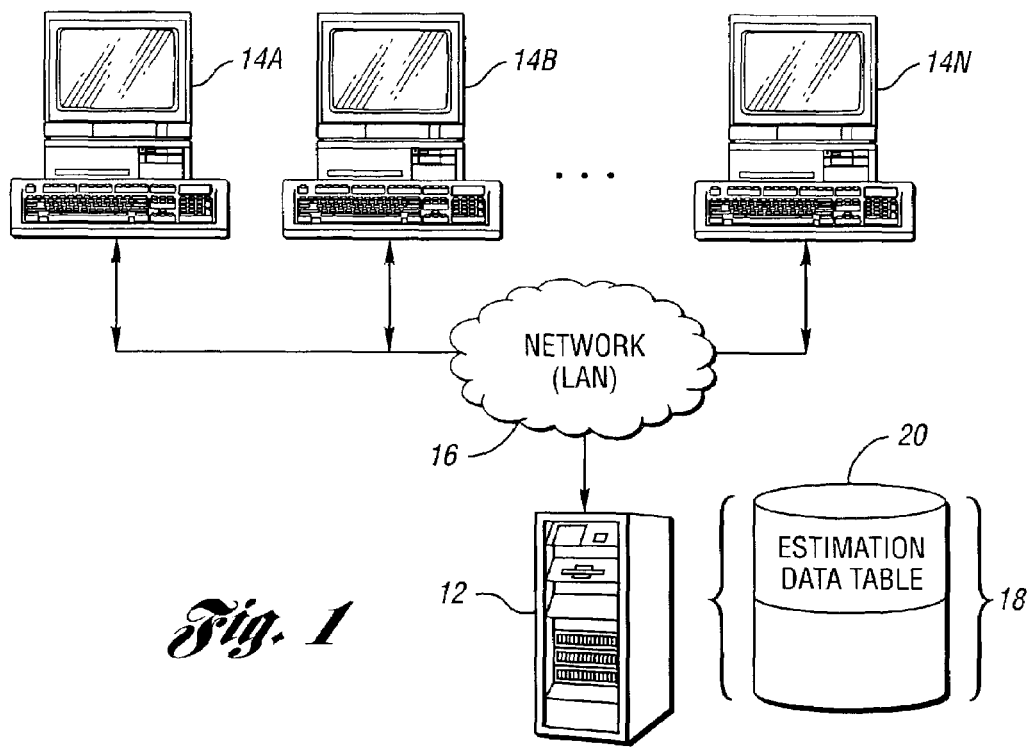
FIG. 1 is a schematic diagram illustrating a preferred embodiment of a system for implementing the present invention.

FIG. 1 is a preferred schematic diagram implementing the present invention. FIG. 1 illustrates an at least one server computer 12 operably serving a plurality of client computers 14A-14N. Client computers 14A-14N preferably communicate with server computer 12 utilizing a TCP-IP communication protocol via network/LAN 16. Server computer 12 is configured to operably store data to, and retrieve information from, at least one database 18. Database 18 contains at least one estimation data table 20.

Figure 2:
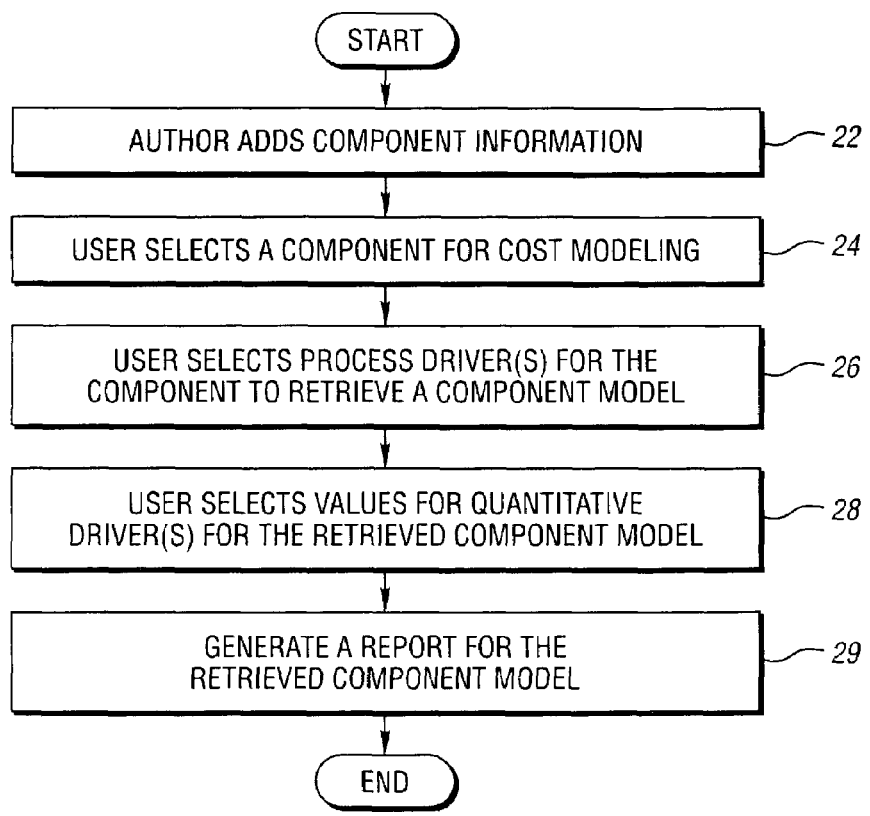
FIG. 2 is a block flow diagram illustrating a preferred methodology for implementing the present invention.

FIG. 2 is a block flow diagram illustrating a preferred methodology for implementing the present invention. As represented in block 22, an author adds information related to a cost modeling component, otherwise referred to as a part, to estimation data table 20. The author typically has extensive experience with estimating costs associated with the part identified for cost modeling. In accord with a preferred embodiment, the author can also add information relating to subsystems or secondary subsystems.

At least one graphical user interface (GUI) hosted by server 12 can be operably configured to receive the following component information from the author: part assumptions, markup defaults, process drivers, component models, and quantitative drivers. The at least one component information GUI, like other GUIs provided in accord with the present invention, may be developed and/or configured utilizing a plurality of client-server interface languages and applications including but not limited to hypertext markup language (HTML), Java Servlets and Java Script. The component information can be operably stored to database 18 by server 12.

The author can add process driver information relating to the component. In accord with a preferred embodiment, process drivers contribute significantly to the overall cost of the component and are qualitatively defined. For example, process drivers can include, but are not limited to, basic material type, part production country, and significant component content differences.

The author can add component models relating to the component. In accord with a preferred embodiment, the component models are defined, in part, by a combination of process driver values. Table 1 gives an example of a list of component models for a fuel tank strap component. In table 1, major process drivers 1 through 4 refer to annual part volume, material, coating, and insulation type, respectively.

TABLE 1

| # | Annual Part Volume | Material | Coating | Insulating Type |
|---|---|---|---|---|
| 1 | low (<120 K) | galvanized steel | none | rubber insulators |
| 2 | low (<120 K) | galvanized steel | none | plastic insulators |
| 3 | low (<120 K) | galvanized steel | painted | rubber insulators |
| 4 | high (>120 K) | painted cold rolled steel | painted | rubber insulators |
| 5 | high (>120 K) | painted cold rolled steel | painted | plastic insulators |
| 6 | high (>120 K) | stainless steel | none | rubber insulators |
| 7 | high (>120 K) | stainless steel | none | plastic insulators |
| 8 | high (>120 K) | stainless steel | none | no insulators |

The author can add quantitative driver information relating to the component models. In accord with a preferred embodiment, quantitative drivers refer to any numeric variable factor that can influence the component cost. For example, the quantitative drivers for a fuel tank strap can include, but are not limited to, strap length (in millimeters), strap width (in millimeters) and strap thickness (in millimeters). It should be understood that quantitative drivers can vary between models. It should also be understood that the unit of measure for the quantitative cost drivers can vary depending based on component and/or model, etc.

In accord with a preferred embodiment, an at least one GUI can be operably configured to receive quantitative driver information. The quantitative driver information can include descriptions, default values, minimum values, and maximum values.

A default value can be established for each quantitative driver. The default value lies between a minimum and maximum possible value for the quantitative driver and is preferably set by the author. The default value can be used as a suggested normal value for the quantitative driver when an approximate measurement is unknown or unavailable. For example, the user can have a financial job function. This user may not know the approximate length of a fuel tank strap. Therefore, the user can use the default value and adjust later if necessary.

A specific model detail can be added for each component model applicable to the component. In accord with a preferred embodiment, the specific model detail can be unique for each component model and can include, but is not limited to, material number, purchased parts, material number for operations processes, and markup percentages. Preferably, a GUI can be operably configured to receive specific model detail information through a plurality of input data fields and data lists.

With respect to the material number, the author can identify the raw material number used in a conventional material data listing for each component model. Specifically, a material and machine cost database (MMCD) can be utilized as the conventional material data listing. With a MMCD material number, the author can locate, among other pieces of information, the material description, cost per unit and unit designation. For example, the MMCD number for a fuel tank strap can be 200181. As derived from the MMCD number 200181, the raw material specification is CR-50XK CR HSLA 0.2832.

With respect to purchased parts, a description of the purchase parts associated with each component model can be generated, preferably by the author. For each purchased part identified, the quantity used, the price, and the weight can be identified.

For example, with respect to a fuel tank strap, a purchased part can be a support pin. Accordingly, the quantity can be one, the price can be $0.076, the material type can be steel, and the weight can be 0.02 kilograms.

It should be understood that some models may use only one purchased part or multiple units of the same purchased part. Consequently, default, minimum and maximum quantities for the purchased part can be determined. For example, some fuel tank straps may require only one support pin, while others may require five support pins. However, fuel tank straps normally require one support pin. Under these circumstances, the author can set the default quantity to one, the minimum quantity to one, and the maximum quantity to five.

With respect to material numbers for operations processes, a detailed description can be provided of the manufacturing process operations for each component model. For each operation of the process, the author can locate the machine description, machine code and cost per minute from the MMCD. Table 2 includes an example of the machine description, the MMCD machine code, the process description and the cycle time for a fuel tank strap.

TABLE 2

| Line # | MMCD machine code | Machine description | Process description | Cycle time |
|---|---|---|---|---|
| 10 | 6600090 | 250 Ton Prog System | Stamp Strap | To be determined later |
| 20 | 5800040 | Multi-stage forming process | Multi Stage Forming | To be determined later |

The markup percentages can be assigned by the author. It should be understood that the author can adjust the markup percentages for sales, general, administrative, profit, and scrap. The markup percentages can also be adjusted based on manufacturing process operations.

As part of defining the specific model detail, algorithms can be provided to compute material usage, cycle time, tooling, weight, etc., based on the quantitative drivers as variables.

For example, a material usage algorithm preferably considers the dimensions of the component and the amount of error or scrap associated with the operation process step. Table 3 includes a material usage algorithm for a component model relating to a fuel tank strap.

TABLE 3

| | |
|---|---|
| Line #: | 10 |
| MMCD #: | 200181 |
| Raw Material: | CR-50XK CR HSLA |
| Material Usage: | [(L + 25.4 mm) * (W + 6.4 mm) * T * D] |
| Finished Weight: | L * W * T * D |
| Price per unit: | $0.609 per kg |
| Density: | 7.842 9/cm$^3$ |

According to Table 3, the length (L), width (W), thickness (T) and density (D) determines the material usage for the fuel tank strap. An extra 25.4 millimeters can be added to L and an extra 6.4 millimeters can be added to W to account for scrap. The material usage value can be multiplied by the price per unit to arrive at the cost of material used.

A cycle time algorithm preferably considers the cycle time for each process applicable to the production of a component. As a first step, attributes, such as dimensions, affecting the cycle time for each process step are preferably identified. In the example depicted in table 4 below, Operation 1 can have a typical cycle time for the fuel tank strap with default measurements of 0.04 minutes. However, the thickness of the fuel tank strap may affect the cycle time of the stamping process. Therefore, the increase or decrease in the thickness greater than 1 millimeter (the default value) can cause the cycle time to likewise increase or decrease by increments of 0.01 minutes per millimeter. For example, if the thickness equals 1.5 mm, the cycle time can increase by 0.005 minutes.

TABLE 4

| Process step | Process description | MMCD machine code | Machine description | Gross cycle time |
|---|---|---|---|---|
| Operation 1 | Stamp strap | 6600090 | 250 Ton Prog system | (0.04 min + ((T-1 mm) * 0.01 min/mm)) |
| Operation 2 | First end spot weld | 1000290 | Spot welding machine | 0.20 min |

With respect to operation 2, the cycle time does not change, regardless of the dimensions of the component or any other attribute. According to Table 4, the first end spot weld operation should take 0.20 minutes.

The tooling cost algorithm preferably considers tooling material and tooling labor (build and design labor). Tooling material is preferably provided based on material type and material usage. Tooling labor is provided based on build and design labor hours. In determining values for tooling material and labor, the typical amount of tooling material needed is preferably computed. For example, according to Table 5, the typical amount of tooling material needed for a fuel tank strap is 16,700 pounds. However, the length of the fuel tank strap can affect the pounds of material needed to build the tool. For example, any length greater then or less than 800 millimeters can result in a proportionate increase or decrease in the amount of material needed at 15,000 pounds per millimeter. Thus, if the length is 1,000 millimeters, then the pounds of material needed would increase by 3,750 pounds.

TABLE 5

| Material type | Price per unit | Tooling material amount |
|---|---|---|
| Steel | $3.00 per pound | ($/lb * (16,700 + ((L-800 mm)/800 mm) * 15,000) |

Table 6 provides an example of determining the tooling labor hours based on the build and design labor rates. In the example, the build labor cost is $11,475 ($45.00 per hour multiplied by 255 hours) and the design labor cost is $11,000 ($55.00 per hour multiplied by 200 hours).

TABLE 6

| Labor type | Labor rate per hour | Tooling labor hours |
|---|---|---|
| Build | $45.00 per hour | 255 hours |
| Design | $55.00 per hour | 200 hours |

It should be understood that the tooling and labor amounts can be the same regardless of the dimensions of the part being produced. For components other than the fuel tank strap, the amount of labor or tooling cost may depend on different attributes.

A weight algorithm preferably provides measurements of the component being modeled. Usually, the material usage value is calculated in pounds and can be used as a measurement of weight. It should be understood that extra weight can be added for some purchased parts. It should also be understood that it can be necessary to subtract process scrap from the material usage value to arrive at the measurement of weight.

In addition to authors providing component information, database administrators can add/edit information supporting the component information. The supporting information is preferably stored in estimation data table 20. This information can be utilized by the author during the addition of component information. Additionally, the supporting information can be used during generation of an cost estimation report, which will be described in greater detail below. At least one GUI can be operably configured to receive supporting information from the database administrator.

Database administrator can add/edit default global database settings. These settings include, but are not limited to, country/region code, purchased part economic level, measurement system, and global estimate assumptions. Database administrator can add/edit product system classification (PSC) information, which includes, but is not limited to, six digit PSC codes and PSC description. Database administrator can add/edit country/region markup defaults, which include, but are not limited to, scrap percentage, sales-generated & administrative (SG&A) percentage, profit percentage, and engineering-design & testing (ED&T) percentage. Database administrator can add/edit application category information (i.e., vehicle, engine, and transmission). Database administrator can add/edit material information and machine information used in models. Material information can include, but is not limited to, code, description, cost per unit, and density. Machine information can include, but is not limited to, code, description, manpower, labor group code, direct labor cost per minute, indirect labor cost per minute, fringe cost per minute, maintenance-repair-other (MRO) labor cost per minute, depreciation cost per minute, utilities cost per minute, floor space cost per minute, indirect materials cost per minute, insurance cost per minute, and other burden cost per minute. Database administrator can also add/edit tooling material (i.e., description, cost per unit and density per unit), tooling design (i.e., cost category and cost per hour), and tooling build (i.e., cost category and cost per hour).

Figure 3:
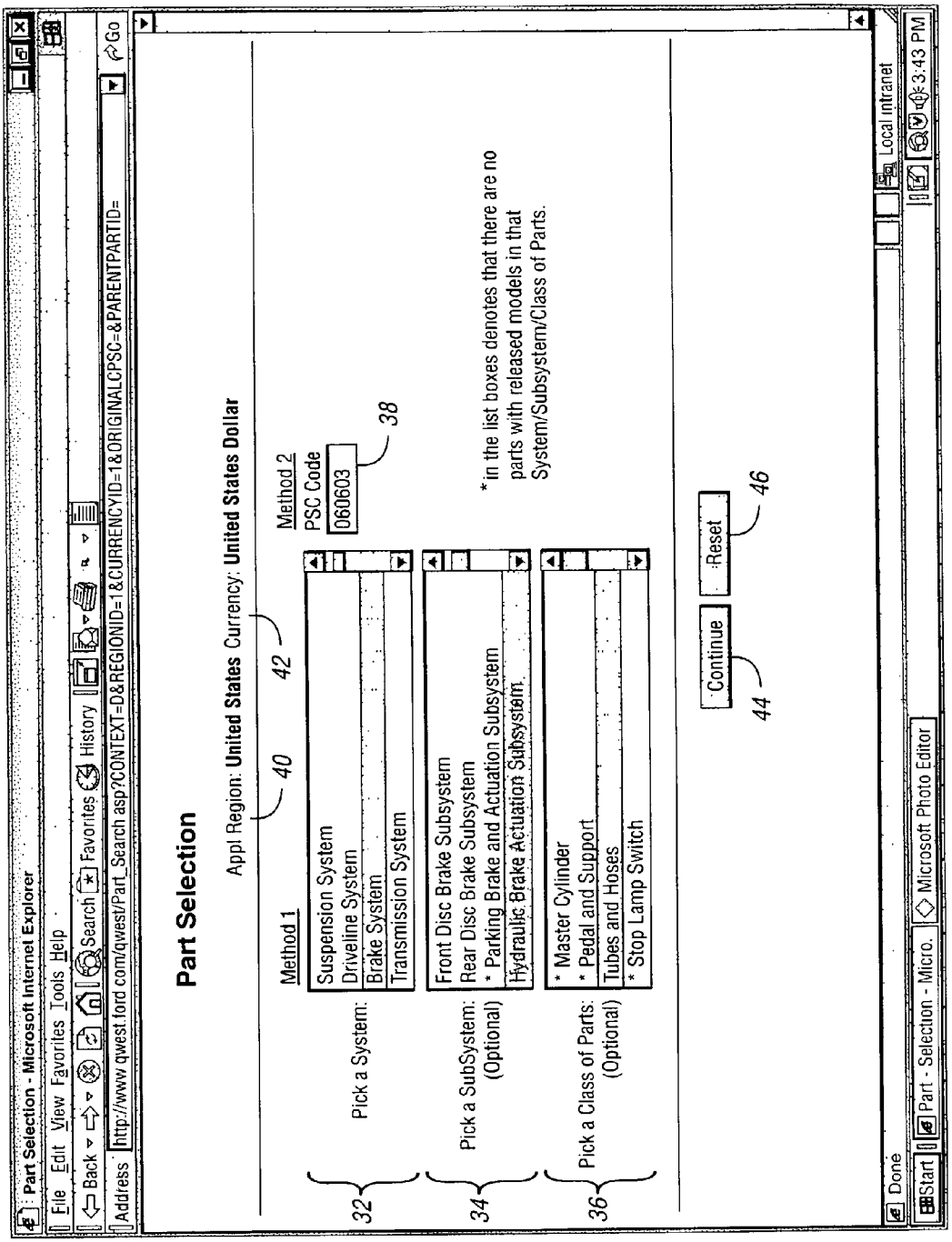
FIG. 3 is a graphical user interface (GUI) for receiving a component in accord with a preferred embodiment of the present invention.

After the author completes component information, a user can select a component for cost modeling as depicted in block 24. It should be understood that a user can be any individual associated with cost estimating, i.e., author, estimator, buyer, financial individual, engineer, or database administrator. FIG. 3 is a GUI 30 hosted by server 12 operably configured to receive a component from the user. GUI 30 can be operably configured to receive a system selected from system list box 32, optionally receive a subsystem from subsystem list box 34, and optionally a class of parts from class of parts list box 36. For example, a user can select brake system, optionally hydraulic brake actuation system, and optionally tubes and hoses class of parts. This information can be used to retrieve component information from estimation data table 20. GUI 30 can also be operably configured to receive a PSC Code in data input field 38. The PSC Code can be used to retrieve component information from estimation data table contained within database 18. For example, if the user inputs PSC Code 060603, brake tubes component information may be retrieved. GUI 30 can also be operably configured to display the application region 40 and currency 42, which is preferably selected by the user. The user can select the "Continue" button 44 after selecting a part. The user can also select the "Reset" button 46 to reset the part selection information, i.e., PSC Code or System.

FIG. 4 is a GUI 45 operably configured to present the retrieved component and related information 47, which can include, but is not limited to, part name, PSC code, subsystem, and class. GUI 45 includes information block 48, which includes, but is not limited to the following information: application region, system, PSC, currency, subsystem and class. GUI 45 can also include "Return" button 49, which can be operably configured to return the user to GUI 30. In accord with a preferred embodiment, the user can select "Design-It" button 51, which allows the user to design a component cost model by selecting values for process drivers and quantitative drivers.

As depicted in block 26 of FIG. 2, the user selects values for process driver(s) for the component. FIG. 5 illustrates a GUI 50 operably configured to receive input defining a component cost model. GUI 50 can be operably configured with a plurality of drop down lists 53A-53N containing values for each process driver. For example, the process drivers for the "brake tubes" component can be manufacturing region, volume, material, and tube diameter and the user can select United States, high volume (>50 k/yr), Algal, and 4.7625 millimeters as values for the process drivers, respectively. In accord with a preferred embodiment, the process driver values are used to retrieve a component model and associated quantitative driver information stored in estimation data table 20. Preferably, the user makes selections from top to bottom and each selection affects the possible process drivers for selections yet to be made. GUI 50 can be operably configured to display process driver information after retrieval.

As depicted in block 28, the user selects values for quantitative driver(s) for the retrieved component model. GUI 50 can be operably configured to display a quantitative driver list 52 that includes the name, unit of measure, minimum value, default value, and maximum value for each quantitative driver. GUI 50 can be operably configured to receive quantitative process value(s) in a plurality of data input fields 56A-N. In accord with a preferred embodiment, data input fields 56A-N can initially contain the default values for each quantitative driver. GUI 50 can also be configured to display cost estimate data fields 58A-C for piece cost, tooling cost, and finished weight; adjustment cost estimate data fields 60A-C for piece cost, tooling cost, and finished weight; and total cost estimate data fields 62A-D for piece cost, tooling cost, and finished weight. Manufacturing cost estimates are determined based on the algorithms input by the author into estimation data table 20. For example, the tooling cost estimate for a fuel tank strap can be determined based on the tooling cost algorithm and the length of the fuel tank strap. It should be understood that the term estimated manufacturing cost can refer to piece cost, tooling cost, total cost or finished weight as well as the sum of the costs of material, purchased parts and manufacturing steps before markup to best fit particular implementation of the present invention. Adjustment cost estimates are preferably determined by the user. By selecting the "Adjustments" button 64, a GUI can be displayed which can be operably configured to receive adjustment cost information. Total cost estimates are preferably determined by summing a cost estimate and an adjustment cost estimate, i.e., summing data fields 58A and 60A. GUI 50 can be operably configured to recalculate cost estimate data fields 58A-C based on user changes to data input fields 56A-N, by selecting "Recalculate" button 66.

GUI 50 can also contain a plurality of buttons including but not limited to the following: "View Report" 66, "Scenarios" button 68, "Save Scenarios" button 70, "Pre-Designed" button 72, "Part Selection" button 74, and "Reset" button 76. By selecting "Save Scenarios" button 70, the current process driver values, quantitative driver values, and cost estimates are preferably stored within estimation data table 20 as a scenario. It should be understood that user can store multiple scenarios. By selecting "Scenarios" button 68, a GUI can be displayed which can be operably configured to display any stored scenario(s). By selecting "Pre-Designed" button 72, a GUI can be displayed which can be operably configured to receive a user's selection of a pre-designed component model with preselected quantitative driver values. By selecting "Part Selection" button 74, GUI 30 of FIG. 3 is preferably displayed. By selecting "Reset" button 76, the quantitative driver default values are restored in data input fields 56A-N.

As depicted in block 29, a report can be generated for the component model. By selecting "View Report" button 68, a scenario report, otherwise referred as a "Cost and Weight Estimate Report" can be generated by server 12 which access estimation data table 20. The scenario report can be displayed as a portable data format (PDF) file. However, it should be understood that other file formats, such as rich text format (RFT) and Microsoft Word document, can be used to display the scenario report.

A non-limiting example of a scenario report can includes, but is not limited to the following information: estimate created by, estimate created date, model number, part number, part description, goes on (vehicle, transmission, or engine), source country, economic level, process drivers selected, quantitative drivers and values entered, specific model detail (description, specification, code, usage, unit, rate, manufacturing cost, markup, and total cost), tooling breakdown (material description and cost, design hours and cost, and build hours and cost), assumptions for part and model, report notes entered by user at run time, global report notes including disclaimers, and summary totals (material manufacturing cost, purchased parts manufacturing cost, operations manufacturing cost, individual markup costs scrap, SG&A, profit and ED&T, manual adjustments, and percent that each summary item is of total cost). It should be understood that the information included in the scenarios report can be modified, rearranged, or removed to best fit a particular implementation.

A purchased part report can also be generated based on the information stored in estimation data table 20. The purchased part report can aid an author in updating the purchased part list. A non-limiting example of a purchased part report can include, but is not limited to, the following information:

region, currency, author(s), PSC, part name, purchased part name(s), purchased part number(s), and cost algorithm(s) for the purchased part(s). It should be understood that the information included in the purchased part report can be modified, rearranged, or removed to best fit a particular implementation.

A model detail report can also be generated based on the information stored in estimation data table 20. A non-limiting example of a model detail report can include, but is not limited to the following information: region, currency, system, subsystem, class, PSC, part name, part assumption(s), process driver(s), process driver value(s), model assumption(s), quantitative driver(s), model markup default(s), manufacturing cost type(s), material information, purchase part information, and operation information. It should be understood that the information included in the model detail report can be modified, rearranged, or removed to best fit a particular implementation.

While the best mode for carrying out the invention has been described in detail, those familiar with the art to which this invention relates will recognize various alternative designs and embodiments for practicing the invention as defined by the following claims.

What is claimed:

1. A computer implemented method for estimating the manufacturing cost of a component, the method comprising:
    electronically receiving a component model wherein the component model includes an at least one quantitative driver and an at least one cost algorithm used to determine the estimated manufacturing cost;
    electronically receiving values for each quantitative driver;
    determining the estimated manufacturing cost for the component based on the values for each quantitative driver and the at least one cost algorithm, wherein the manufacturing cost includes a finished weight, a material usage and cycle time;
    wherein the material usage and the at least one cost algorithm is comprised of a material usage algorithm that is based on component dimensions and scrap associated with manufacturing and the cycle time and the at least one cost algorithm is comprised of a cycle time algorithm that is based on the amount of time needed to perform each process applicable to the production of a component and transmitting the estimated manufacturing cost to a user.

2. The method of claim 1 wherein the manufacturing cost further includes a piece cost and a tooling cost.

3. The method of claim 2 wherein the at least one cost algorithm is comprised of a tooling cost algorithm.

4. The method of claim 3 wherein the tooling cost algorithm is at least based on tooling material and tooling labor.

5. The method of claim 1 wherein the at least one cost algorithm is comprised of a weight algorithm.

6. The method of claim 5 wherein the weight algorithm is at least based on the dimensions of the component.

7. An online system for estimating the manufacturing cost of a component, the system comprising at least one server computer operably serving at least one client computer, the at least one server computer configured to:
    (i) receive a component model wherein the component model includes an at least one quantitative driver and an at least one cost algorithm used to determine the estimated manufacturing cost;
    (ii) receive values for each quantitative driver;
    (iii) determine the estimated manufacturing cost for the component based on the values for each quantitative driver and the at least one cost algorithm, wherein the manufactured cost includes a finished weight; and (iv) transmit the estimated manufacturing cost to a user
    (iv) transmit the estimated manufacturing cost to a user.

8. The online system of claim 7 wherein the manufacturing cost further includes a piece cost and a tooling cost.

9. The online system of claim 8 wherein the at least one cost algorithm is comprised of a tooling cost algorithm.

10. The online system of claim 9 wherein the tooling cost algorithm is at least based on tooling material and tooling labor.

11. The online system of claim 7 wherein the at least one cost algorithm is comprised of a weight algorithm.

12. The online system of claim 11 wherein the weight algorithm is at least based on the dimensions of the component.

13. A computer-readable medium having computer-executable instructions for performing a method comprising:
    receiving a component model wherein the component model includes an at least one quantitative driver and an at least one cost algorithm used to determine the estimated manufacturing cost;
    receiving values for each quantitative driver;
    determining the estimated manufacturing costs for the component based on the values for each quantitative driver and the at least one cost algorithm, wherein the manufacturing cost includes a finished weight; and
    transmitting the estimated manufacturing cost to a user.

14. The computer-readable medium of claim 13 wherein the manufacturing cost further includes a piece cost and a tooling cost.

15. The computer-readable medium of claim 14 wherein at least one cost algorithm is comprised of a tooling cost algorithm.

16. The computer-readable medium of claim 15 wherein the tooling cost algorithm is at least based on tooling material and tooling labor.

17. The computer-readable medium of claim 13 wherein the at least one cost algorithm is comprised of a weight algorithm.

18. The computer-readable medium of claim 17 wherein the weight algorithm is at least based on the dimensions of the component.

19. The method of claim 1 wherein the manufacturing cost includes a material usage and cycle time.

20. The method of claim 19 wherein the material usage and the at least one cost algorithm is comprised of a material usage algorithm that is based on component dimensions and scrap associated with manufacturing and the cycle time and the at least one cost algorithm is comprised of a cycle time algorithm that is based on the amount of time needed to perform each process applicable to the production of a component.

* * * * *